(12) United States Patent
Niewczas

(10) Patent No.: US 9,519,545 B2
(45) Date of Patent: Dec. 13, 2016

(54) STORAGE DRIVE REMEDIATION IN A RAID SYSTEM

(71) Applicant: Facebook, Inc., Menlo Park, CA (US)

(72) Inventor: Mateusz Marek Niewczas, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 147 days.

(21) Appl. No.: 14/538,703

(22) Filed: Nov. 11, 2014

(65) Prior Publication Data

US 2016/0132394 A1    May 12, 2016

(51) Int. Cl.
*G06F 11/00* (2006.01)
*G06F 11/14* (2006.01)
*G06F 3/06* (2006.01)
G06F 11/10 (2006.01)
G06F 11/07 (2006.01)

(52) U.S. Cl.
CPC ............. *G06F 11/1441* (2013.01); *G06F 3/06* (2013.01); *G06F 11/1092* (2013.01); *G06F 11/0709* (2013.01); *G06F 11/0793* (2013.01); *G06F 11/108* (2013.01); *G06F 11/1088* (2013.01)

(58) Field of Classification Search
CPC .............. G06F 11/0793; G06F 11/0709; G06F 11/1088; G06F 11/1441; G06F 11/2033; G06F 11/2069
See application file for complete search history.

(56) References Cited

U.S. PATENT DOCUMENTS

| | | | | |
|---|---|---|---|---|
| 7,634,679 B2* | 12/2009 | Quintiliano | ......... | G06F 11/1662 714/12 |
| 2002/0138696 A1* | 9/2002 | Kodama | ................. | H04L 29/06 711/114 |
| 2004/0255189 A1* | 12/2004 | Chu | .................... | G06F 11/2051 714/13 |
| 2015/0309871 A1* | 10/2015 | Brauer | ................ | G06F 11/1076 714/6.24 |
| 2016/0132394 A1* | 5/2016 | Niewczas | ........... | G06F 11/1441 714/6.22 |

* cited by examiner

*Primary Examiner* — Charles Ehne
(74) *Attorney, Agent, or Firm* — Perkins Coie LLP

(57) ABSTRACT

Techniques, systems, and devices are disclosed for remediating a failed drive in a set of drives, such as a RAID system, without having to physically replace the failed drive. After receiving a signal of an error indicating a specific physical portion on a storage drive in the set of storage drives has caused the drive to fail, the system can unmount the drive from the filesystem while other drives continue to operate. Next, the system can identify one or more files in the filesystem that have associations with the specific physical portion on the failed drive. Next, the system can remount the drive onto the filesystem and subsequently delete the identified files from the filesystem. The system can then perform a direct I/O write to the specific physical portion on the failed drive to force reallocation of the specific physical portion to a different area on the failed drive. The system can also power-cycle the drive before this remediation, e.g., to determine if this remediation can be avoided.

20 Claims, 8 Drawing Sheets

STORAGE DRIVE REMEDIATION IN A RAID SYSTEM

TECHNICAL FIELD

The disclosed embodiments are directed to remediating failed storage drives in a storage array, such as a redundant array of independent disks (RAID).

BACKGROUND

Driven by the explosive growth of social media and demand for social networking services, computer systems continue to evolve and become increasingly more powerful in order to process larger volumes of data and to execute larger and more sophisticated computer programs. To accommodate these larger volumes of data and larger programs, computer systems are using increasingly higher capacity drives, e.g., hard disk drives (HDDs or "disk drives"), solid state drives (SSDs) including flash drives, and optical media as well as larger numbers of drives, typically organized into drive arrays, e.g., redundant arrays of independent disks (RAID). For example, some storage systems currently support more than thousands of drives. Meanwhile, the storage capacity of a single drive has surpassed several terabytes.

In more sophisticated storage system designs, storage system designers have developed techniques to mitigate the loss of data caused by drive failures. For example, in RAID systems, arrays employ two or more drives in combination to provide data redundancy so that data loss due to a drive failure can be recovered from associated drives. In some conventional RAID system designs, when a failure is detected on a specific RAID disk drive, which may be due to one or more bad blocks or a scratch on the disk drive, the RAID system would flag the hard drive as failed. Subsequently, the flagged drive is removed from the RAID system, and the erroneous drive is swapped with a replacement drive. However, replacing a RAID drive can result in significant downtime. First, the entire RAID system has to be taken "off-line" for the failed drive to be swapped out. Next, the RAID system is "rebuilt" which is an extremely time-consuming procedure, partly due to the ever-increasing capacity of the drives. For example, it can take a week of time to rebuild a 15-drive, 60-terabyte RAID system. As such, conventional techniques for managing a drive error/failure in RAID systems are associated with high cost and huge delays, are wasteful and highly inefficient.

DETAILED DESCRIPTION

Figure 1:
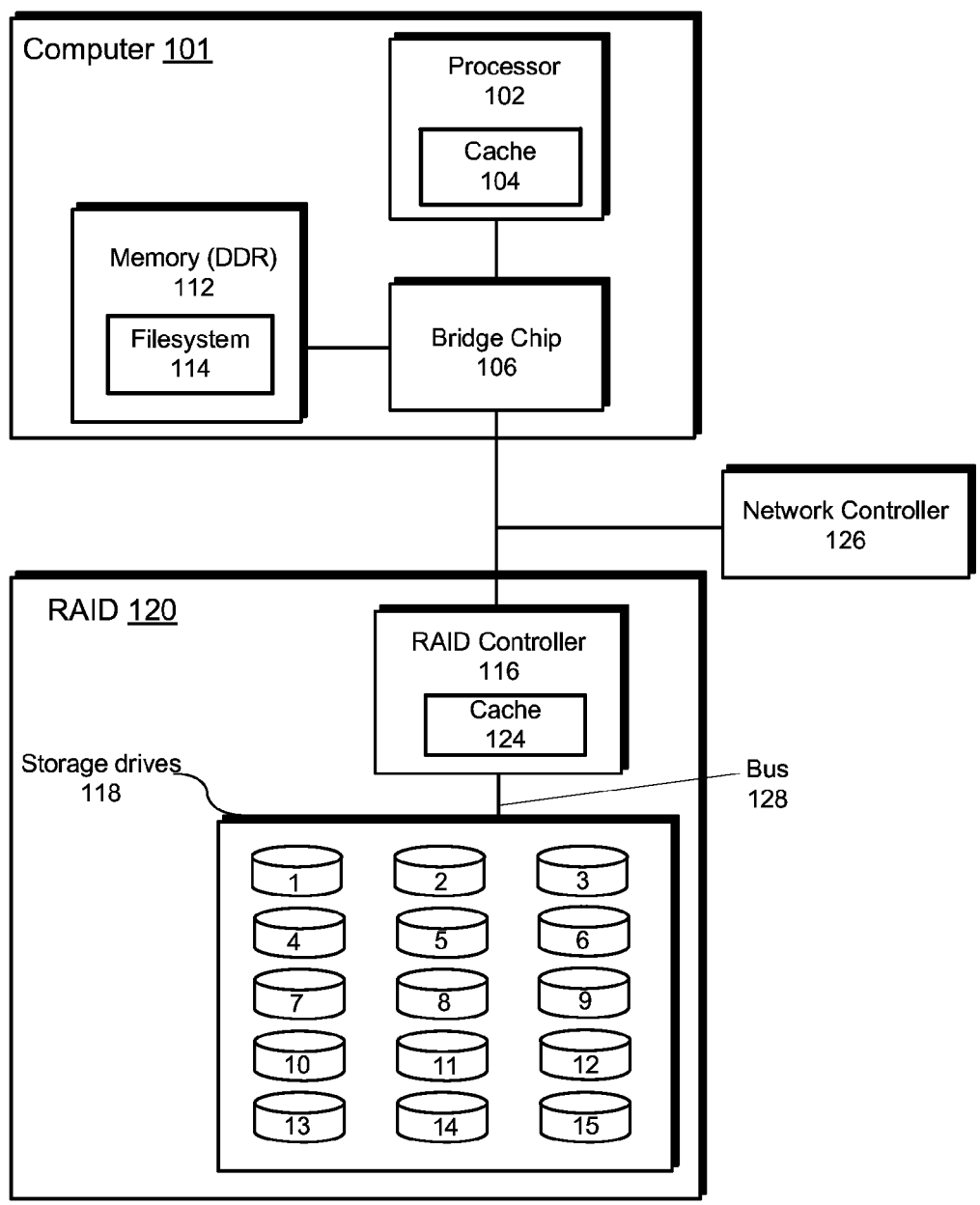
FIG. 1 is a schematic diagram illustrating an exemplary storage array system, such as a RAID-based system.

In some existing redundant array of independent disks (RAID) systems, the disk drive that is flagged for an error or a failure (collectively referred to as a "failed drive" hereinafter) is removed from the RAID system regardless of the cause of the flag, and a replacement drive is installed in place of the failed drive. However, physically replacing the RAID drive can be a time-consuming, costly, and labor-intensive task. For example, when running a Hadoop application on an XFS filesystem in RAID 0 storage arrays, physically replacing a failed drive requires an entire Hadoop namespace to be offline while the RAID 0 array is rebuilt after a failed drive is replaced, which can take many hours, days, or even weeks to complete. Moreover, replacing an entire drive when only a few sectors are unusable can be wasteful.

Disclosed are various embodiments for remediating a drive containing flagged bad portions (e.g., bad sectors) in a storage array system comprising a set of storage drives, such as a RAID system, without having to physically replace the failed drive. A disclosed remediation system first receives a signal of an error indicating that a specific physical portion on a storage drive in the set of storage drives has caused the storage drive to fail. After receiving the signal, the remediation system can unmount the drive from the filesystem while other drives continue to operate. Next, the remediation system can identify one or more files in the filesystem that have associations with the specific physical portion on the failed drive. Next, the remediation system can remount the drive onto the filesystem and subsequently delete the identified files from the filesystem. The remediation system can then perform a direct I/O write to the specific physical portion on the failed drive to force reallocation of the specific physical portion to a different area on the failed drive. The remediation system can also power-cycle the drive before this remediation, e.g., to determine if this remediation can be avoided.

In some embodiments, prior to unmounting the storage drive from the filesystem, the remediation system performs a power-cycling remediation on the storage drive and then determines whether power-cycling the storage drive has fixed the error in the storage drive. If so, further remediation operations can be skipped and, as a result, downtime can be avoided, cost can be reduced, resources can be saved. In some embodiments, performing the power-cycling remediation includes attempting to capture first storage drive information of the storage drive before power-cycling the storage drive, power-cycling the storage drive, and attempting to capture second storage drive information of the storage drive after the power cycling of the storage drive. To determine whether power-cycling the storage drive has fixed the error in the storage drive, various embodiments compare the captured first storage drive information with the captured second storage drive information and then analyze the differences between the first storage drive information and the second storage drive information to determine whether the error in the storage drive has been fixed. In some embodiments, the storage drive information can include self-monitoring, analysis, and reporting technology (SMART) data and metadata.

In some embodiments, prior to unmounting the storage drive from the filesystem, the remediation system attempts to capture first storage drive information of the storage drive before power-cycling the storage drive. Various embodiments then power-cycle the storage drive. Next, various embodiments attempt to capture second storage drive information of the storage drive after the power cycling of the storage drive. If both attempts to capture the first storage drive information and the second storage drive information have failed, various embodiments determine that the storage drive is not remediable and subsequently stop any further remediation operation. Various embodiments may then generate a decision to replace the storage drive.

In some embodiments, a disclosed remediation system first receives a signal of an error indicating that a specific physical portion on a storage drive in the set of storage drives has caused the storage drive to fail. The failed storage drive is then unmounted from the filesystem while other storage drives in the set of storage drives continue to operate. Next, the remediation system identifies one or more files in the filesystem that have associations with the specific physical portion on the storage drive and subsequently delete the identified files from the filesystem. Next, the remediation system remounts the storage drive onto the filesystem. The remounting action causes each of the deleted files to be re-created at a different region on the storage drive that does not include the indicated specific portion of the storage drive. By deleting the files in the filesystem affected by the flagged physical sectors, the remediation system masks those areas on the failed drive that are more likely to fail, so that a filesystem, a RAID controller, or an application would recognize those areas on the drive and not attempt to use those areas.

Turning now to the Figures, FIG. 1 is a schematic diagram illustrating an exemplary storage array system 100, such as a RAID-based system. As can be seen in FIG. 1, storage array system 100 includes a computer 101, which further includes a processor 102 and a memory 112 coupled to processor 102 through a bridge chip 106. Memory 112 can include a dynamic random access memory (DRAM) such as a double data rate synchronous DRAM (DDR SDRAM), a static random access memory (SRAM), flash memory, read only memory (ROM), and any other type of memory. Memory 112 stores a filesystem 114, which is configured to manage data files stored on mass storage (described below) of the storage array system 100. In some embodiments, filesystem 114 is an XFS filesystem, but filesystem 114 can also include other types of filesystems. Bridge chip 106 can generally include any type of circuitry for coupling components of computer 101 together, such as a southbridge or a northbridge.

Processor 102 can include any type of processor, including, but not limited to, a microprocessor, a mainframe computer, a digital signal processor, a personal organizer, a device controller and a computational engine within an appliance, and any other processor now known or later developed. Furthermore, processor 102 can include one or more cores. Processor 102 includes a cache 104 that stores code and data for execution by processor 102. Although FIG. 1 illustrates storage array system 100 with one processor, storage array system 100 can include more than one processor. In a multi-processor configuration, the processors can be located on a single system board or multiple system boards.

Storage array system 100 also includes a RAID 120, which further includes a RAID controller 116 coupled to a set of storage drives 118. The set of storage drives 118 can include a set of hard disk drives (HDDs), a set of solid state drives (SSDs), a set of hybrid drives of HDDs and SSDs, a set of solid state hybrid drives (SSHDs) that incorporate flash memory into a hard drive, a set of optical drives, and a combination of the above, among other drive arrays.

RAID controller, which may also be referred to as a "RAID card," "RAID controller card," or "storage array controller," is a hardware device that manages the operations of each storage drive 118 and presents the physical storage drives to computer 101 and filesystem 114 as logical blocks. RAID controller 116 can include a cache 124. While not explicitly shown, RAID controller 116 is coupled to each storage drive 118 through a bus 128. In some embodiments, RAID controller 116 may be implemented in software either on computer 101 or on RAID 120. RAID 120 can include RAID of standard levels, such as RAID 0, RAID 1, RAID 2, RAID 3, RAID 4, RAID 5, and RAID 6, and RAID of non-standard levels, such as RAID 10 or a Hadoop-based RAID system. While 15 disk drives labelled as 1-15 are shown in this example, other implementations of a storage array system can include fewer or more storage drives. In some embodiments, each storage drive 118 has a 4-terabyte capacity, and the RAID 120 has 60 terabytes total storage.

Processor 102 communicates with RAID controller 116 and RAID 120 through bridge chip 106. Processor 102 is also coupled to a network controller 126 through bridge chip 106. Network controller 126 provides a communication interface between RAID 120 and the Internet, other computer networks, or another storage array system. In some embodiments, network controller 126 is implemented as a network interface card (NIC).

Note that although various embodiments of this disclosure may be described in the context of a storage array comprising an array of HDDs, the disclosed embodiments can generally operate on any type of storage array system that comprises multiple volumes or multiple drives. For example, the disclosed embodiments can be applied to a set of SSDs, a set of hybrid drives of HDDs and SSDs, a set of SSHDs that incorporate flash memory into a hard drive, a set of optical drives, and a combination of the above, among other drive arrays. The disclosed embodiments can be applied to a storage array system comprised of multiple RAID systems (e.g., a cluster of RAID systems) coupled together through switches. The disclosed embodiments can also be applied to storage array systems of any configuration, and hence is not limited to the specific implementation of the storage array system 100 as illustrated in FIG. 1.

Over the course of use, a particular drive within the set of storage drives 118 can experience an error and/or a failure. An error or a failure in a disk drive can have various causes. For example, a failure due to the electrical circuitry of a disk drive is typically instantaneous and catastrophic. Another common disk drive failure is due to a mechanical failure of the rotating structure in the disk drive. Some other errors and/or failures are not catastrophic, for example, those caused by one or more bad sectors or a surface scratch. Under conventional approaches, the drive that is flagged for an error (e.g., an I/O error) or a failure is removed from the RAID system regardless of the cause of the flag, and a replacement drive is installed in place of the failed drive. However, physically replacing the RAID drive under conventional approaches can be a time-consuming, costly, and labor-intensive task.

In some embodiments, if a drive error is detected as being the result of one or more bad physical sectors on the drive, the area of the drive containing the bad sectors can be marked as "bad." Next, if a read or write attempt is directed to the marked area on the drive, the system will trigger a reallocation of the data associated with those bad sectors. In conventional hard disk drives, physical sectors have a 512-byte size (some newer HDD can use different sector sizes). In contrast, a filesystem often uses a different block size, for example, XFS uses 4K-byte block sizes. In this example, a 512-byte bad sector is part of a 4K block on the XFS. When a write access is directed to a smaller block or a portion of this 4K block, a read/write verify is triggered which involves a read request. Unfortunately, the RAID controller, such as RAID controller 116 in FIG. 1, recognizing that the 4K block contains a bad sector, will deny this read request, which subsequently causes the initial write access to fail. This scenario has two undesirable consequences: (1) good sectors within a 4K-byte block containing at least one bad sector cannot be accessed; and (2) a 4K-byte block containing a bad sector cannot be reallocated.

Instead of replacing a failed drive, some embodiments remediate a failed drive (e.g., a failed RAID drive) through power cycling (e.g., to restart, to turn off and then turn on, etc.), thereby reducing the likelihood that the failed drive has to be physically replaced. In some cases, power-cycling can fix or resolve the error and/or failure. As such, if the power-cycling can fix or resolve the error and/or failure, then the failed drive does not need to be replaced, thereby saving valuable resources. However, in many cases when the failure is due to a portion of the drive becomes damaged or defective, simply performing power cycling usually does not resolve the failure.

Various embodiments enable remediating a drive containing flagged bad portions (e.g., bad sectors) in a storage array system comprising a set of storage drives, such as a RAID system, without having to physically replace the failed drive. In some embodiments, a disclosed remediation system first receives a signal of an error indicating that a specific physical portion on a storage drive in the set of storage drives has caused the storage drive to fail. The disclosed remediation system then unmounts the failed storage drive from the filesystem without disrupting the operations of other storage drives in the set of storage drives. The remediation system subsequently identifies areas on the unmounted drive that are affected by those identified bad portions. In some embodiments, the remediation system scans the inode structure of the filesystem to identify each file in the filesystem that is affected by the identified bad portions (hence, such a remediation system may be referred to as a "filesystem-based remediation" system). Next, the identified areas on the drive are "masked" so that a filesystem, a RAID controller, or an application would recognize those areas on the drive and not attempt to use those areas. The remediation system then remounts the storage drive onto the filesystem. After remounting the drive, the remediation system deletes the identified files from the filesystem, including deleting the identified files affected by the bad portions and also deleting associations to the identified files. Next, the remediation system performs direct I/O writes to the identified bad portions on the failed drive to force reallocations of the identified bad portions to an area of the drive that is free and does not include bad sectors.

Some embodiments attempt to remediate a failed drive through power cycling the drive prior to performing a filesystem scan to identify the affected files. Note that if a drive has experienced serious physical damage, a filesystem-based remediation attempt on the drive, which can add many hours of filesystem scanning time, may not help to fix the drive. By power cycling the drive prior to filesystem-based remediation, various embodiments can determine whether the failed drive is remediable. If so, the filesystem-based remediation process can proceed. Otherwise, the disclosed embodiments can make a decision to replace the drive without further remediation action. Note that sometimes, the power-cycling operation itself can fix or resolve some errors or failures experienced by the drive. In such cases, no further filesystem-based remediation action may be required after the power cycling-based remediation.

In some embodiments, after unmounting the failed drive from the filesystem but prior to identifying areas of the drive affected by the bad sectors, a power-cycling remediation process is applied to the failed drive. More specifically, an attempt to capture the drive information is taken before a power cycling. Then the drive is power cycled. Next, a second attempt to capture drive information is taken. In some cases, the captured drive information before and after the power cycling are then compared to determine whether the power cycling has fixed or resolve the drive error/failure. If so, the filesystem-based remediation can be skipped. Otherwise, the embodiments proceed to further remediate the drive through filesystem scanning as described above. In some cases, however, the power-cycling remediation process fails to capture drive information either before the power cycling or both before and after the power cycling, which can indicate that the drive has a serious media error and is not remediable. In such cases, the filesystem-based remediation is also skipped, and the decision may be made to replace the drive.

Figure 2:
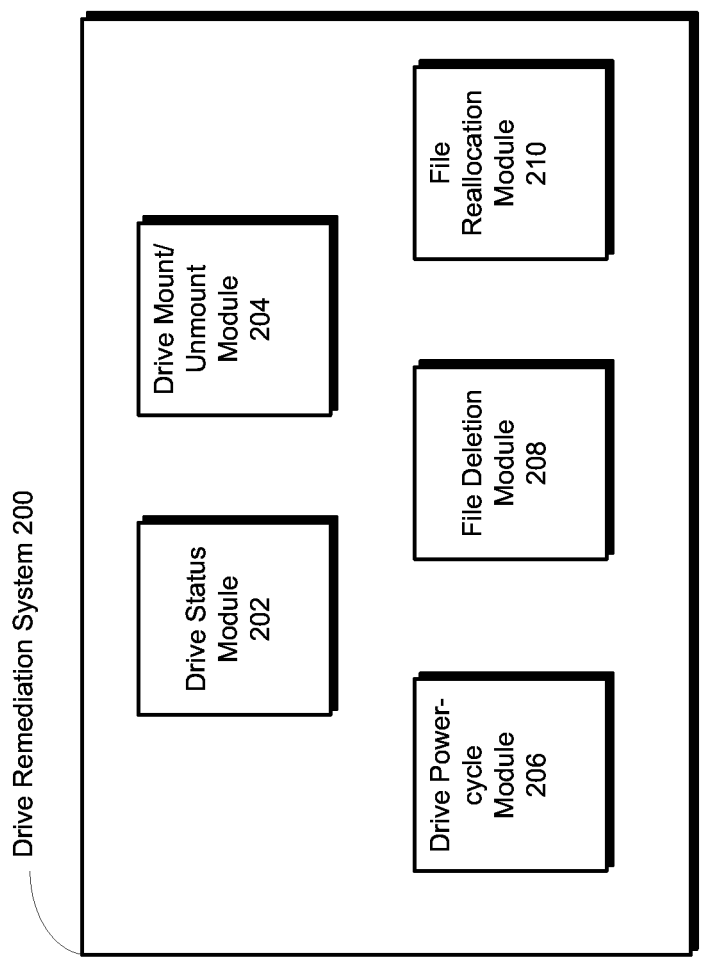
FIG. 2 is a block diagram illustrating a drive remediation system configured to facilitate remediating a failed drive in a RAID system in accordance with some embodiments of the present disclosure.

FIG. 2 is a block diagram illustrating a drive remediation system 200, or "system 200" (both "drive remediation system 200" and "system 200" are used hereinafter) configured to facilitate remediating a failed drive in a RAID system in accordance with some embodiments of the present disclosure. Drive remediation system 200 can be configured to perform, manage, and/or facilitate various tasks or operations associated with remediating a failed drive, such as an HDD or an SSD, in a RAID system, such as a RAID array, or a RAID cluster. System 200 may be implemented as hardware, software, or a combination of hardware and software. For example, system 200 may be implemented in software within a filesystem, such as filesystem 114 in FIG. 1. In some embodiments, system 200 is implemented on Apache Hadoop© as a Hadoop application. In some embodiments, system 200 can be configured to operate in conjunction with a RAID controller, such as RAID controller 116. In some embodiments, system 200 can be implemented within a social networking system.

As can be seen in FIG. 2, drive remediation system 200 includes a drive status module 202, a drive mount/unmount module 204, a drive power-cycle module 206, a file deletion module 208, and a file reallocation module 210. Drive status module 202 can be configured to monitor and report the operation status of each drive in the RAID system. In one example, drive status module 202 can be associated with a monitoring component, which can be configured to monitor I/O errors on specific regions (e.g., physical sectors) of a given drive in the RAID array. Drive status module 202 can be configured to receive information about the drive via the monitoring component. If the drive undergoes an error and/or failure, drive status module 202 can receive a notification, alarm, or signal indicating that the drive has experienced the error and/or has failed. Drive status module 202 can also flag the drive as having an error, and it can include specific error types, such as an I/O error, and physical location of the error, for example, by identifying the locations of the bad sectors. Drive status module 202 can communicate the signal of the error or failure to other components of system 200.

Drive mount/unmount module 204, which is coupled to drive status module 202, is configured to unmount a failed drive from the filesystem after receiving a signal indicating an error and/or failure on a given drive in the RAID system. In some embodiments, the unmounted drive can continue to communicate with the RAID controller. Drive mount/unmount module 204 is also configured to remount the drive onto the filesystem after one or more remediation processes have been performed on the failed drive that had been previously unmounted.

Power-cycle module 206 can be configured to cause a drive to undergo power cycles (e.g., to restart, to turn off and then turn on, etc.). More specifically, drive power-cycle module 206 can instruct or command the drive that experienced the error and/or failure to undergo a power-cycling process. In some cases, the power cycle can fix or resolve the error and/or failure of the drive. Power-cycle module 206 may be configured to collect drive information both before and after the power cycling and compare the collected drive information before and after the power cycling to determine whether the power cycle on the drive has fixed or resolved the drive failure. Power-cycle module 206 may also determine that the failed drive is irremediable and needs to be replaced with a new drive. In some embodiments, power-cycle module 206 is optional in drive remediation system 200.

File deletion module 208 may be configured to identify one or more files in the filesystem that are affected by or have associations with the flagged bad portions (e.g., bad sectors) of a failed drive. In some embodiments, to identify affected files, file deletion module 208 may be configured to map bad physical sectors of the drive to logical block addresses (LBAs) recognized by the RAID controller, convert the LBAs into data block addresses of the filesystem, and scan the inode structure of the filesystem to identify files that either directly contain flagged bad physical sectors or are merely associated with the bad physical sectors. File deletion module 208 is also configured to delete the identified files (i.e., the corresponding inodes in the inode map) that are affected by the bad physical sectors.

File reallocation module 210 may be configured to reallocate/remap each of the identified bad sectors to a different region of the drive that is free and does not include flagged bad sectors. In some embodiments, when the drive is remounted by drive mount/unmount module 204, file reallocation module 210 is activated to perform direct I/O writes to the identified bad sectors on the drive to force reallocations of each of the identified bad sectors to a different area of the drive that is free and does not include flagged bad sectors. In doing so, file reallocation module 210 may also create a new G-list entry so that the next time a write/read request is directed to an LBA containing the bad sectors, the request can be redirected/remapped to the corresponding reallocated locations on the drive.

In some embodiments, while drive remediation system 200 operates in an attempt to remediate a failed drive in a set of storage drives of a storage array system, other storage drives in the set of storage drives continue to operate without interruption. This means the proposed remediation system can avoid or reduce significant downtime typically associated with replacing a failed drive in a RAID system.

Referring to the storage array system of FIG. 1, filesystem 114 on computer 101 typically does not have a direct pass-through to reference physical sectors on storage drives 118 because the physical sectors are masked by the RAID controller 116. In some embodiments, to remediate a drive flagged with I/O errors from the filesystem level, it is necessary to map the bad physical sectors on the failed drive to files in the filesystem 114.

Figure 3:
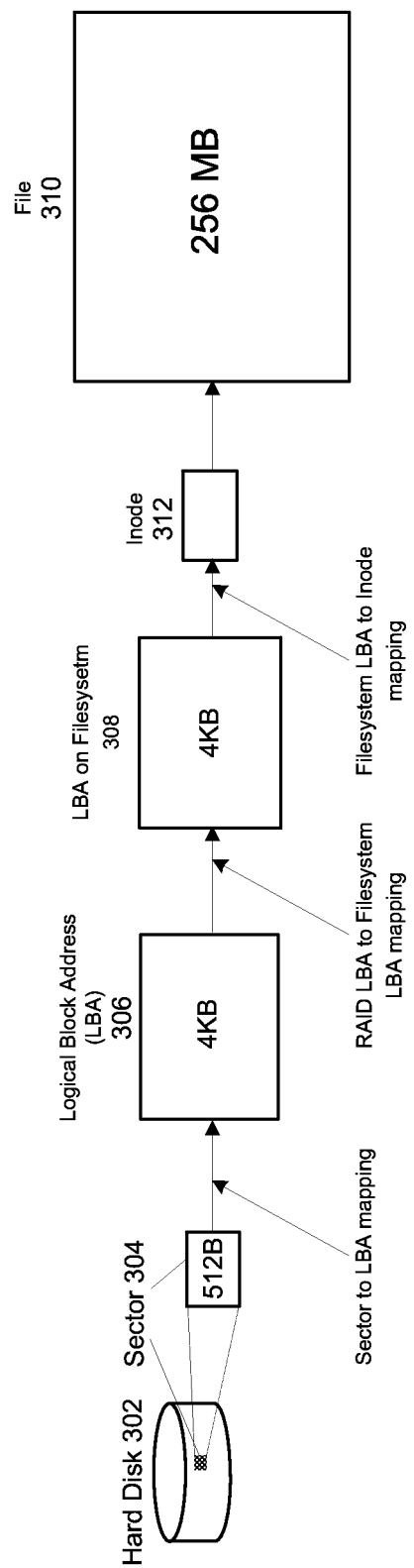
FIG. 3 is a block diagram illustrating a process of mapping a bad sector in a drive within a RAID system to a file on a filesystem coupled to the storage array system.

FIG. 3 is a block diagram illustrating a process of mapping a bad sector in a hard drive, such as an HDD in a RAID system, to a file on a filesystem coupled to the storage array system. As can be seen in FIG. 3, a hard drive 302, which can be one of the storage drives 118 in FIG. 1, contains a bad physical sector 304 that has a 512-byte size (some newer HDDs can use different sector sizes). Sector 304 is mapped to a logical block address (LBA) 306 corresponding to a 4K-byte block size recognized by the RAID controller, such as RAID controller 116 in FIG. 1. Hence, when the RAID controller detects bad sector 304 on hard drive 302, the RAID controller can flag a media error on LBA 306 of the 4K-byte block containing bad sector 304. In this example, the 512-byte bad sector 304 is part of a 4K block while other 512-byte sectors in the 4K block addressed by LBA 306 can be good or bad sectors. Hence, if multiple bad sectors are detected, they can be mapped to either a single LBA or multiple LBAs.

Next, the flagged LBA 306 is mapped to an LBA on the filesystem, such as filesystem 114 in FIG. 1. In some embodiments, the filesystem uses the same logical block size as the RAID controller, such as a 4K-byte block size, and hence there is a one-to-one mapping between flagged LBA 306 and a corresponding LBA 308 on the filesystem. Finally, to map bad sector 304 to a file on the filesystem, LBA 308 is used to search/scan a file structure, such as an inode map, to identify a file 310 in the filesystem that contains LBA 308. More specifically, filesystem LBA 308 is mapped to an inode 312 that is a representation of file 310. In some embodiments, identified file 310 in the filesystem has a much greater size than the data block addressed by LBA 308. For example, on XFS, each file has 256 megabytes. In other examples, the identified file can have a size greater or smaller than 256 megabytes. Note that when an I/O error on the drive is caused by multiple consecutive bad sectors, these bad sectors can be mapped to a single file or multiple files on the filesystem. In some embodiments, the identified file 310 and files that have associations to the identified inode 312, such as hidden files, symbolic links or other pointers to the affected files, are subsequently deleted.

Figure 4:
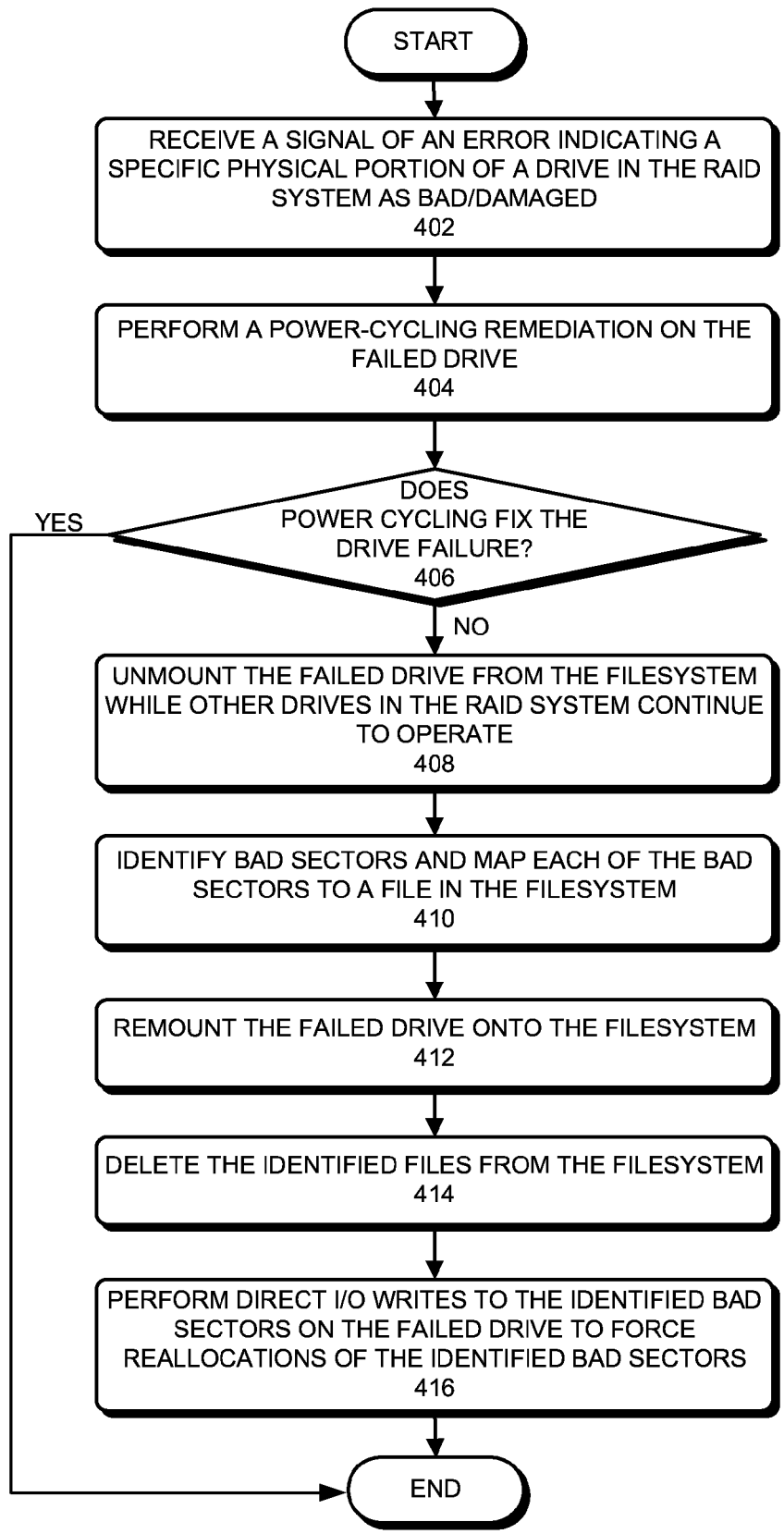
FIG. 4 is a flowchart diagram illustrating a process of remediating a failed drive in a RAID system, such as RAID 0, in accordance with some embodiments of the present disclosure.

FIG. 4 is a flowchart diagram illustrating a process of remediating a failed drive in a RAID system, such as RAID 0, in accordance with some embodiments of the present disclosure. In some embodiments, the disclosed remediation system is implemented as a software module in a filesystem, such as filesystem 114 in FIG. 1. The RAID system includes a set of storage drives communicatively coupled to the filesystem. In some embodiments, the disclosed remediation system is implemented on Apache Hadoop® as a Hadoop application, such as within a Hadoop distributed file system (HDFS). During operation, the disclosed remediation system receives a signal of an error identifying a specific physical portion of a drive in the RAID system as bad/damaged (block 402). For example, the damaged physical portion on the drive can include one or more bad sectors.

The RAID system can include a set of HDDs, a set of SSDs such as flash drives, and other types of storage units.

Upon receiving the error signal, the remediation system can perform a power-cycling remediation on the failed drive (block 404). More specifically, the remediation system can instruct or command the failed drive to undergo a power cycling, for example, to restart or to turn the power off and then turn the power back on. In some cases, the power cycling alone can fix or resolve the error and/or failure of the drive without requiring further remediation. For example, if the drive is stuck in a failed state for any of various reasons, the power cycling can bring the drive out of the failed state. Next, the remediation system determines whether power cycling the failed drive has fixed or resolved the drive failure (block 406). If so, the remediation system can exit the remediation process by skipping the filesystem-based drive remediation. As will be described below, the proposed filesystem-based drive remediation can take hours (e.g., due to scanning the inode map). Hence, attempting to use power cycling to quickly fix a failed drive can potentially reduce hours of downtime while performing the filesystem-based drive remediation. However, if the disclosed remediation system determines that power cycling does not fix the drive error at block 406, the process then moves to the filesystem-based drive remediation procedure described below. In some embodiments, the power cycling based remediation blocks 404 and 406 are omitted from the drive remediation process illustrated in FIG. 4.

To make the determination at decision block 406, the remediation system can attempt to acquire drive information both before and after the power cycling and subsequently analyze the drive information. Analysis of the drive information data may include, for example, comparing the data from the first attempt before the power cycling and the data from the second attempt after the power cycling to find differences between the data from the first attempt and the data from the second attempt. In some cases, differences, if any, in the data can indicate that the error and/or failure has been resolved. If, however, the first attempt was unsuccessful, then the remediation system can just analyze the data acquired from the drive in the second attempt. In some embodiments, failure to capture drive information both before and after power cycling indicates that the drive has a serious media error and is not remediable. In such cases, the filesystem-based remediation is also skipped, and the decision may be made to replace the drive.

Figure 5:
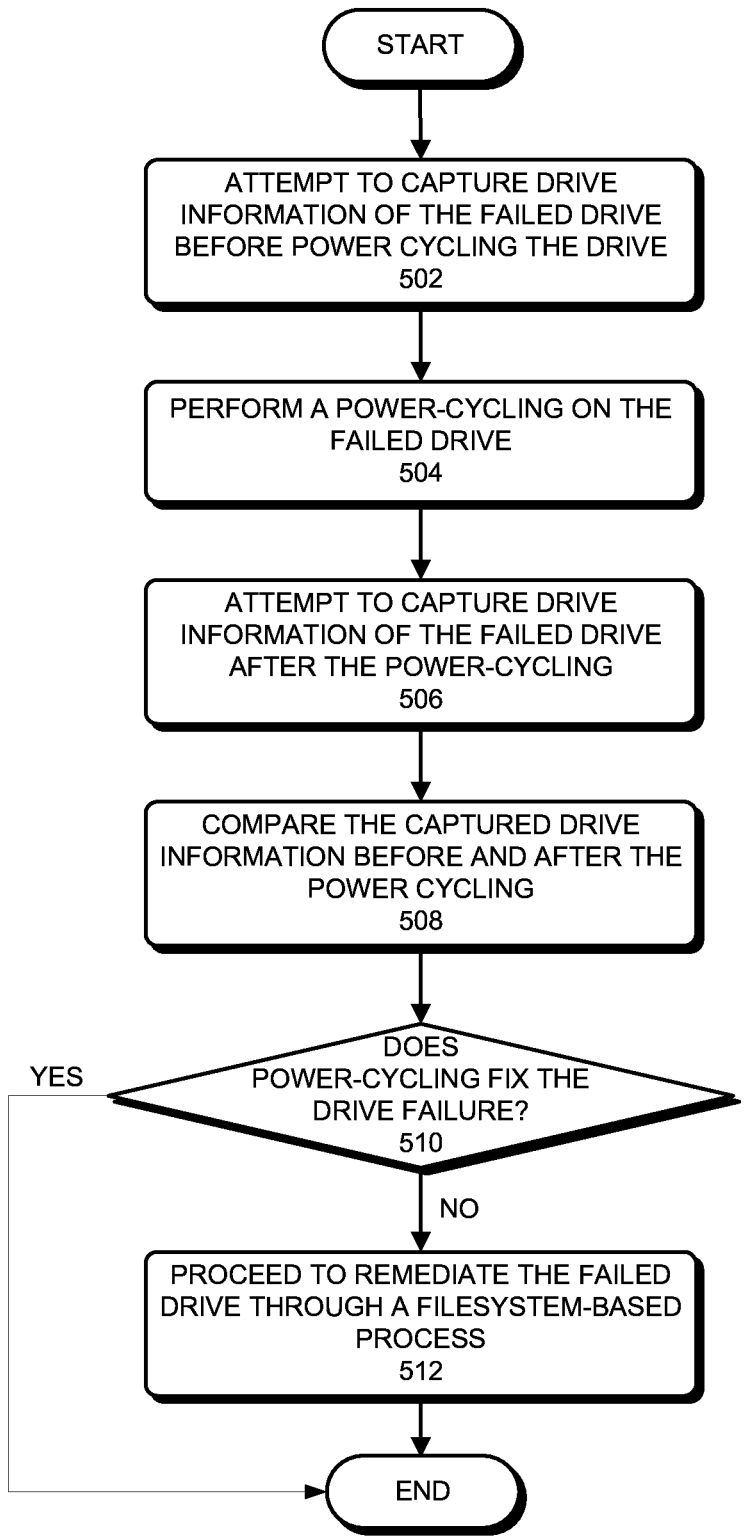
FIG. 5 is a flowchart diagram illustrating a process of attempting to remediate a failed drive through power cycling prior to performing a filesystem-based remediation in accordance with some embodiments of the present disclosure.

FIG. 5 is a flowchart diagram illustrating a process of attempting to remediate a failed drive through power cycling prior to performing a filesystem-based remediation in accordance with some embodiments of the present disclosure. More specifically, the process attempts to capture drive information (e.g., SMART data, metadata, etc.) of the failed drive before power-cycling the drive (block 502). Then the process performs a power cycling on the failed drive, e.g., by restarting the drive or by turning off and then turning on the power (block 504). Next, the process attempts to capture drive information of the failed drive again (block 506). The process then compares the captured drive information before and after the power cycling (block 508) and subsequently determines whether the power cycling has fixed the failed drive based on the comparison (block 510). If so, the power cycling has remediated the failed drive, and no further remediation is necessary. Otherwise, the process proceeds to further remediate the failed drive through a filesystem-based process (block 512).

Referring back to the process of FIG. 4, if the remediation system determines that power cycling does not fix the drive error at block 406, the remediation system then unmounts the failed drive from the filesystem while other drives in the RAID system continue to operate on the filesystem (block 408). In some embodiments, the unmounted drive can continue to communicate with the RAID controller.

Figure 6:
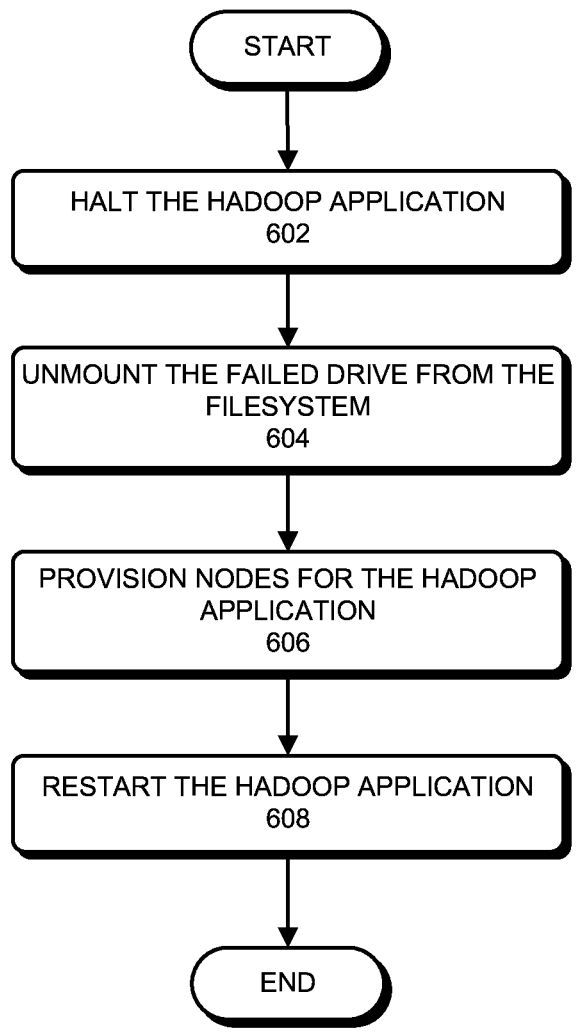
FIG. 6 is a flowchart diagram illustrating a process of unmounting a failed drive from the filesystem while running a Hadoop application associated with the RAID system in accordance with some embodiments of the present disclosure.

Note that if the RAID system operates in conjunction with a Hadoop application such as a Hadoop distributed file system (HDFS), unmounting the drive may require additional logic to accommodate the Hadoop application. FIG. 6 is a flowchart diagram illustrating a process of unmounting a failed drive from the filesystem while running a Hadoop application associated with the RAID system in accordance with some embodiments of the present disclosure. During operation, the process halts the Hadoop application (block 602). The process subsequently unmounts the failed drive from the filesystem similar to block 408 described above (block 604). The process then provisions nodes for the Hadoop application (block 606). Next, the process restarts the Hadoop application (block 608).

Returning to the process of FIG. 4, after unmounting the failed drive, the remediation system then identifies those physical sectors within the failed drive that caused the drive to fail (i.e., the bad sectors) and subsequently maps each of the bad physical sectors to a file in the filesystem (block 410). Note that block 410 may be repeated for each of the identified bad sectors if the error/failure of the drive is caused by multiple bad sectors (e.g., due to a physical scratch). Hence, block 410 may yield multiple files that have associations with the drive error. Because mapping bad sectors to inodes/files in the filesystem can take from a few to many hours, the above-described power-cycling remediation procedure may be used to bypass the filesystem-based remediation entirely if the failed drive is irremediable or fixable through the power cycling as described above.

Figure 7:
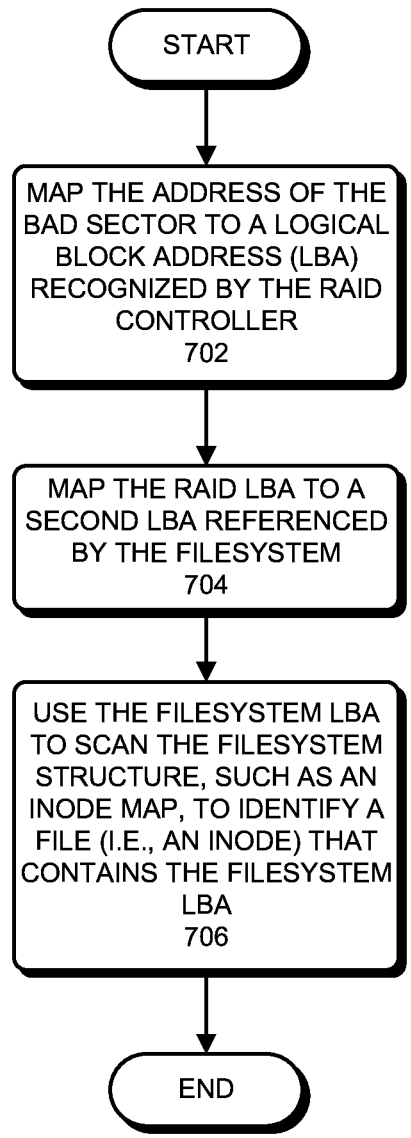
FIG. 7 is a flowchart diagram illustrating a process of mapping an identified bad sector in the failed drive to a file in the filesystem in accordance with some embodiments of the present disclosure.

FIG. 7 is a flowchart diagram illustrating a process of mapping an identified bad sector in the failed drive to a file in the filesystem in accordance with some embodiments of the present disclosure. During operation, the process maps the address of the bad sector to an LBA recognized by the RAID controller (block 702). As described in the example of FIG. 3, the mapping from physical sector to the LBA may involve mapping a smaller physical sector (e.g., 512-byte size) to a bigger data block addressed by the LBA (e.g., 4K-byte size). Next, the process maps the RAID LBA to a second LBA referenced by the filesystem, such as an XFS (block 704). In some embodiments, the filesystem LBA addresses a data block of the same size as the data block addressed by the RAID LBA. The process then uses the filesystem LBA to scan the filesystem structure, such as an inode map, to identify a file (i.e., an inode) that contains the filesystem LBA (block 706). As mentioned above, the identified file of the filesystem can be significantly larger (e.g., 256 MB) than the data block addressed by the filesystem LBA. In some embodiments, the scanning also identifies those files that have associations to the identified inode, including hidden files, symbolic links, or other pointers to the affected files.

Returning to the process of FIG. 4, after identifying files in the filesystem affected by the bad sectors at block 410, the remediation system remounts the failed drive onto the filesystem (block 412). After remounting the drive, the remediation system deletes the identified files from the filesystem (block 414). For example, the remediation system can delete the inodes from the inode map representing the identified files. After remounting the drive, the remediation system also performs direct I/O writes to the identified bad sectors on the failed drive to force reallocations of the identified bad sectors (block 416). A given direct I/O write directed to a given identified bad sector causes an I/O error, which triggers the reallocation of the data being written from the bad sector to an area that is free of useful data and does not include the identified bad sectors. As a result, the bad sector is remapped to a new physical sector in that area. In some embodiments, each direct I/O write can target the 4K-byte LBA associated with the bad sector on the failed drive. If multiple bad sectors correspond to a same LBA, a single direct I/O write to that 4K-byte LBA can generate multiple I/O errors from the multiple bad sectors, thereby triggering the remapping of the multiple bad sectors to a new physical block. The direct I/O write can write random data or all 0s to the LBA and therefore to the bad sectors. In some embodiments, reallocating the bad sectors within a data block addressed by a LBA allows those sectors within the same data block but not marked as bad to be reused.

A given direct I/O write performed in block 416 can target different sizes of the drive space. For example, a direct I/O write can be 512-byte size to target a single physical sector, or a 4K-byte size to target a 4K-byte LBA containing at least one bad sector, or larger than 4K-byte size up to 256 MB of a full size file. For example, a direct I/O write can target an entire 256 MB corresponding to an inode that was deleted in block 414. The direct I/O writes can cause the G-list of the failed drive to grow. Monitoring the G-list counts can determine if the intended reallocations have occurred. Furthermore, a successful reallocation of a bad sector can be checked by attempting to read from the bad sector to see if there is still any I/O errors.

Figure 8:
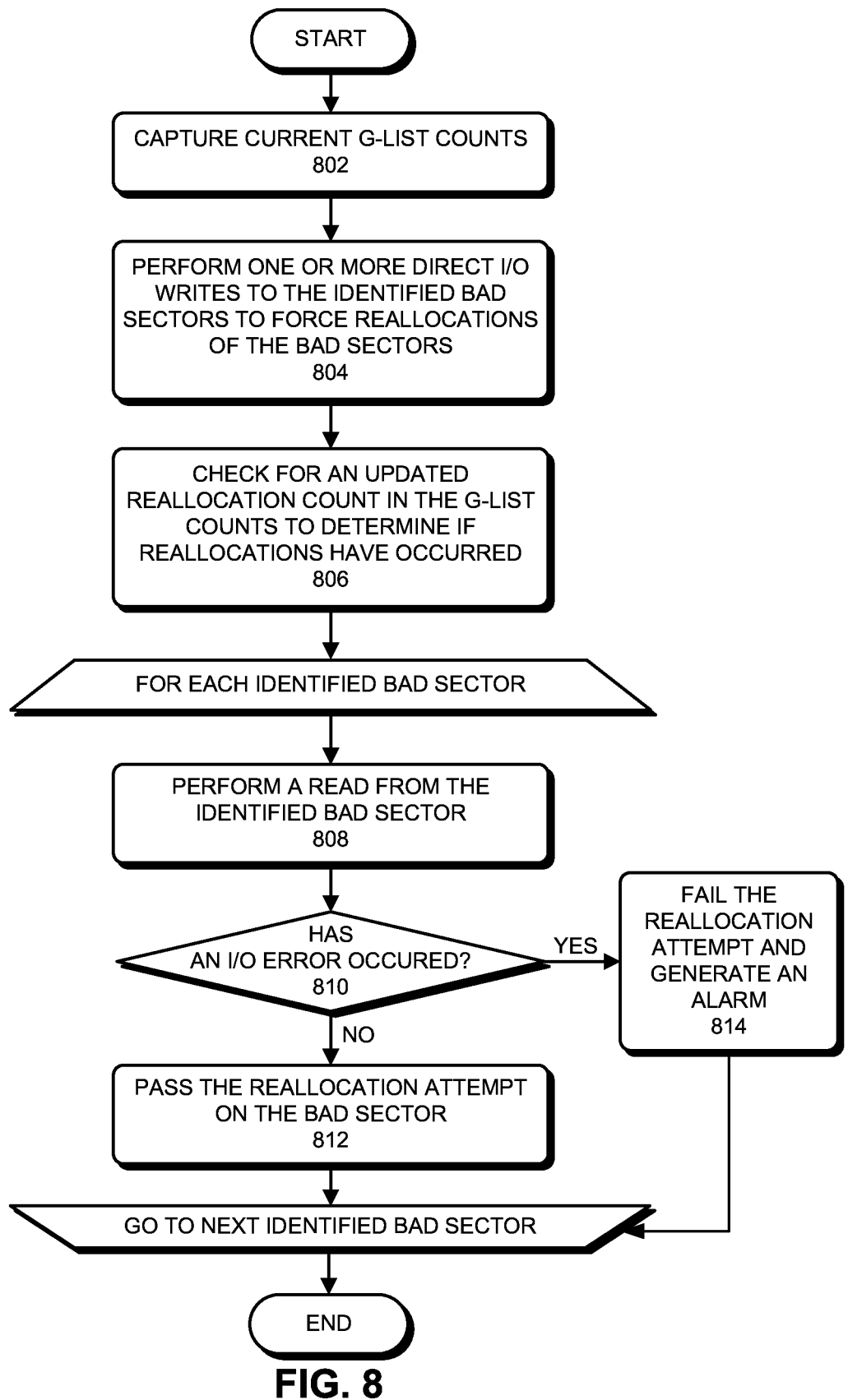
FIG. 8 is a flowchart diagram illustrating a process of reallocating identified bad sectors in accordance with some embodiments of the present disclosure.

FIG. 8 is a flowchart diagram illustrating a process of reallocating identified bad sectors in accordance with some embodiments of the present disclosure. During operation, the process first captures current G-list counts for the failed drive (block 802). In block 802, ECC counts may also be captured. The process then performs one or more direct I/O writes to the identified bad sectors to force reallocations of the bad sectors (block 804). After performing the direct writes, the process checks for an updated reallocation count in the G-list counts to determine if reallocations have occurred (block 806). For example, the updated reallocation count can be compared with the earlier capture G-list count. As mentioned above, the updated reallocation count should be greater than the captured reallocation count before performing the direct writes. Next, the process determines if each of the reallocations is successful by performing a read from each of the identified bad sectors (block 808). The process determines if the read has caused an I/O error (block 810). If no I/O error has occurred, the process passes the reallocation attempt on the bad sector (block 812). Otherwise, the process fails the reallocation attempt on the bad sector and generates an alarm (block 814).

After performing the direct I/O writes to force reallocations of the identified bad sectors, each of the deleted files is no longer a data corrupted file. When the Hadoop application is installed, the remounting of the drive will trigger the Hadoop application to perform an inode scan to detect changes in the inode map. After the reallocations of the identified bad sectors, if the Hadoop application detects an inode, i.e., a file is missing, the Hadoop application can place a different file at the location of the missing file, replace the missing file, or just do nothing.

Various embodiments for drive remediation describe above significantly reduce downtime when a storage array system experiences a drive failure. Instead of taking the entire array of drives offline to swap out the failed drive, some disclosed embodiments take only the failed drive offline while the rest of the drives in the storage array continue to operate. For example, for the set of storage drives 118 in the system 100 that contains 15 drives, when one of the drives experiences a failure, some disclosed embodiments only take only the failed drive offline, while the other 14 drives continue to operate. While the failed drive is offline, the disclosed embodiments can perform a "surgery" on the failed drive to identify one or more areas that are specifically failing, and they subsequently mask those area so that storage applications or data applications could recognize those areas as bad and not to be used.

In some embodiments, if the RAID system operates in conjunction with a Hadoop application, unmounting the storage drive from the filesystem would require first halting the Hadoop application and then unmounting the storage drive from the filesystem. Next, the process provisions nodes for the Hadoop application and restarts the Hadoop application.

In some embodiments, the Hadoop application includes a HDFS, and remediating the failed drive in the RAID system is controlled by the HDFS.

In some embodiments, to identify the one or more files in the filesystem that have associations with the specific physical portion on the storage drive, the embodiments first identify physical sectors within the specific physical portion on the storage drive. Next, for each of the identified physical sectors, the embodiments map a given physical sector to a first logical block address (LBA) recognized by the RAID system and then map the first LBA to a second LBA referenced by the filesystem. The embodiments subsequently scan the filesystem to identify a file that contains the second LBA. For example, some embodiments can scan an inode map of the filesystem to identify an inode based on the second LBA. In some embodiments, to delete a given file in the identified one or more files in the filesystem, the disclosed embodiments delete a corresponding inode in the filesystem representing the given file.

In some embodiments, the embodiments further identify files that have associations to the identified inode, including hidden files, symbolic links or other pointers to the identified inode.

In some embodiments, the filesystem includes an XFS.

In some embodiments, the RAID system includes a RAID 0.

In some embodiments, the set of storage drives includes one or more of a set of HDDs, a set of SSDs, a set of hybrid drives of HDDs and SSDs, a set of SSHDs, a set of optical drives, and a combination of the above.

These and other aspects are described in greater detail in the drawings, the description and the claims.

Implementations of the subject matter and the functional operations described in this patent document can be implemented in various systems, in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a filesystem. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document and attached appendices contain many specifics, these should not be construed as limitations on the scope of any claims or of what may be claimed, but rather as descriptions of features that may be specific to particular embodiments. Certain features that are described in this patent document and attached appendices in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendices should not be understood as requiring such separation in all embodiments.

Only a few implementations and examples are described, and other implementations, enhancements and variations can be made based on what is described and illustrated in this patent document and attached appendices.

What is claimed is:

1. A method performed by a computing device having a processor and memory for remediating a failed storage drive in a redundant array of independent disks (RAID) system comprising a set of storage drives and configured for use with a filesystem, comprising:
    receiving, by the computing device, a signal of an error indicating a specific physical portion on a storage drive in the set of storage drives has caused the storage drive to fail;
    unmounting, by the computing device, the storage drive from the filesystem while other storage drives in the set of storage drives continue to operate;
    identifying, by the computing device, one or more files in the filesystem that have associations with the specific physical portion on the storage drive;
    responsive to identifying the one or more files, remounting, by the computing device, the storage drive onto the filesystem;
    deleting, by the computing device, the identified one or more files from the filesystem; and
    performing, by the computing device, a direct I/O write to the specific physical portion on the storage drive to force reallocation of the specific physical portion to a different area on the storage drive.

2. The method of claim 1, wherein prior to unmounting the storage drive from the filesystem, the method further comprises:
    performing a power-cycling remediation on the storage drive;
    determining whether power-cycling the storage drive has fixed the error in the storage drive; and
    if so, exiting the storage drive remediation process.

3. The method of claim 2, wherein performing the power-cycling remediation on the storage drive includes:
    attempting to capture first storage drive information of the storage drive before power-cycling the storage drive;
    power-cycling the storage drive; and
    attempting to capture second storage drive information of the storage drive after the power cycling of the storage drive.

4. The method of claim 3, wherein determining whether power-cycling the storage drive has fixed the error in the storage drive includes:
    comparing the captured first storage drive information with the captured second storage drive information; and
    analyzing the differences between the first storage drive information and the second storage drive information to determine whether the error in the storage drive has been fixed.

5. The method of claim 3, wherein the storage drive information includes self-monitoring, analysis, and reporting technology (SMART) data and metadata.

6. The method of claim 1, wherein prior to unmounting the storage drive from the filesystem, the method further comprises:
    attempting to capture first storage drive information of the storage drive before power-cycling the storage drive;
    power-cycling the storage drive;
    attempting to capture second storage drive information of the storage drive after the power cycling of the storage drive; and
    if both attempts to capture the first storage drive information and the second storage drive information have failed, determining that the storage drive is not remediable and stopping the remediation operation.

7. The method of claim 6, wherein after determining that the storage drive is not remediable, the method further comprises generating a decision to replace the storage drive.

8. The method of claim 1, wherein the RAID system operates in conjunction with a Hadoop application, and wherein unmounting the storage drive from the filesystem includes:
    halting the Hadoop application;
    unmounting the storage drive from the filesystem;
    provisioning nodes for the Hadoop application; and
    restarting the Hadoop application.

9. The method of claim 8, wherein the Hadoop application includes a Hadoop distributed file system (HDFS).

10. The method of claim 9, wherein the method for remediating the failed drive in the RAID system is controlled by the HDFS.

11. The method of claim 1, wherein identifying the one or more files in the filesystem that have associations with the specific physical portion on the storage drive includes:
    identifying physical sectors within the specific physical portion on the storage drive; and
    for each of the identified physical sectors,
        mapping a given physical sector to a first logical block address (LBA) recognized by the RAID system;
        mapping the first LBA to a second LBA referenced by the filesystem; and
        scanning the filesystem to identify a file that contains the second LBA.

12. The method of claim 11, wherein scanning the filesystem includes scanning an inode map of the filesystem to identify an inode based on the second LBA.

13. The method of claim 12, wherein deleting a given file in the identified one or more files in the filesystem includes deleting a corresponding inode in the filesystem representing the given file.

14. The method of claim 12, wherein identifying the one or more files in the filesystem that have associations with the specific physical portion on the storage drive further includes identifying files that have associations to the identified inode, including hidden files, symbolic links, or other pointers to the identified inode.

15. The method of claim 1, wherein the filesystem includes an XFS.

16. The method of claim 1, wherein the RAID system includes a RAID 0.

17. A non-transitory computer-readable storage medium storing instructions for remediating a failed storage drive in a redundant array of independent disks (RAID) system comprising a set of storage drives and configured for use with a filesystem, comprising:
    instructions for receiving a signal of an error indicating a specific physical portion on a storage drive in the set of storage drives has caused the storage drive to fail;
    instructions for unmounting the storage drive from the filesystem while other storage drives in the set of storage drives continue to operate;
    instructions for identifying one or more files in the filesystem that have associations with the specific physical portion on the storage drive;
    instructions for remounting the storage drive onto the filesystem;
    instructions for deleting the identified one or more files in the filesystem; and
    instructions for performing a direct I/O write to the specific physical portion on the storage drive to force reallocation of the specific physical portion to a different area on the storage drive.

18. The non-transitory computer-readable storage medium of claim 17, wherein identifying the one or more files in the filesystem that have associations with the specific physical portion on the storage drive includes:
    identifying physical sectors within the specific physical portion on the storage drive; and
    for each of the identified physical sectors,
        mapping a given physical sector to a first logical block address (LBA) recognized by the RAID system;
        mapping the first LBA to a second LBA referenced by the filesystem; and
        scanning the filesystem to identify a file that contains the second LBA.

19. A storage array system, comprising:
    a computer including:
        a processor; and
        a memory storing a filesystem; and
    a redundant array of independent disks (RAID) system coupled to the computer and configured for use with the filesystem, wherein the RAID system comprises:
        a set of storage drives; and
        a RAID controller coupled between the set of storage drives and the computer and configured to manage operations of each of the set of storage drives,
    wherein the processor in collaboration with the memory is operable to remediate a failed storage drive in the set of storage drives by:
        receiving a signal of an error indicating a specific physical portion on a storage drive in the set of storage drives has caused the storage drive to fail;
        unmounting the storage drive from the filesystem while other storage drives in the set of storage drives continue to operate;
        identifying one or more files in the filesystem that have associations with the specific physical portion on the storage drive;
        remounting the storage drive onto the filesystem;
        deleting the identified one or more files in the filesystem; and
        performing a direct I/O write to the specific physical portion on the storage drive to force reallocation of the specific physical portion to a different area on the storage drive.

20. The storage array system of claim 19, wherein the set of storage drives includes one of:
    a set of hard disk drives (HDDs);
    a set of solid state drives (SSDs);
    a set of hybrid drives of HDDs and SSDs;
    a set of solid state hybrid drives (SSHDs);
    a set of optical drives; and
    a combination of the above.

* * * * *